US008228891B2

(12) United States Patent  
Bertagnole et al.

(10) Patent No.: US 8,228,891 B2
(45) Date of Patent: Jul. 24, 2012

(54) TRAFFIC LOAD BALANCING

(75) Inventors: Albert G. Bertagnole, Monroe, NC (US); David L. Chavez, Broomfield, CO (US); Jeffrey Meis, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 711 days.

(21) Appl. No.: 11/734,135

(22) Filed: Apr. 11, 2007

(65) Prior Publication Data

US 2008/0181106 A1     Jul. 31, 2008

Related U.S. Application Data

(60) Provisional application No. 60/887,408, filed on Jan. 31, 2007.

(51) Int. Cl.
    *H04J 3/24* (2006.01)
(52) U.S. Cl. .................. 370/349; 370/310; 370/345
(58) Field of Classification Search .................. None
    See application file for complete search history.

(56) References Cited

U.S. PATENT DOCUMENTS

| | | | |
|---|---|---|---|
| 5,745,850 A | | 4/1998 | Aldermeshian et al. |
| 5,963,866 A * | | 10/1999 | Palamara et al. .......... 455/456.5 |
| 5,999,813 A | | 12/1999 | Lu et al. |
| 6,144,671 A * | | 11/2000 | Perinpanathan et al. ..... 370/409 |
| 6,587,688 B1 | | 7/2003 | Chambers et al. |
| 7,031,697 B2 | | 4/2006 | Yang et al. |
| 7,110,516 B2 | | 9/2006 | Sarp et al. |
| 7,245,709 B2 | | 7/2007 | Dobner et al. |
| 7,245,912 B1 | | 7/2007 | Fenton et al. |
| 2002/0181398 A1 | | 12/2002 | Szlam |
| 2002/0186679 A1 * | | 12/2002 | Nakatsugawa et al. ........ 370/349 |
| 2002/0191595 A1 | | 12/2002 | Mar et al. |
| 2003/0134631 A1 | | 7/2003 | Snyder et al. |
| 2003/0174648 A1 * | | 9/2003 | Wang et al. .................... 370/235 |
| 2004/0028205 A1 | | 2/2004 | Lim et al. |
| 2004/0062382 A1 | | 4/2004 | Sylvain |
| 2004/0072590 A1 | | 4/2004 | Eynard et al. |
| 2004/0082331 A1 | | 4/2004 | Peng |
| 2004/0082332 A1 | | 4/2004 | McCann et al. |
| 2004/0114559 A1 * | | 6/2004 | Wang ............................. 370/338 |

(Continued)

FOREIGN PATENT DOCUMENTS

EP           1450569              8/2004

(Continued)

OTHER PUBLICATIONS

Official Action for European Application No. 07121920, dated Nov. 11, 2008.

(Continued)

*Primary Examiner* — Jae Y Lee
(74) *Attorney, Agent, or Firm* — Sheridan Ross P.C.

(57) ABSTRACT

In one embodiment, an enterprise network is provided that includes a mobility module 150 associated with a first or second switch/server 100 or 104, respectively. On the second switch/server, the mobility agent manages a pool of mobility user station records 168*a-j* and creates visitor application records 172*a-i* associated with a external subscriber communication devices 136*a-n*. Each visitor application record is associated with a subscriber whose communication device is controlled by the first switch/server 100. In response to a selected stimulus, outgoing call processing for selected communication devices on the first switch/server is moved to the second switch/server 104 by associating, for each such device, a selected record 168 with a corresponding record 172.

23 Claims, 5 Drawing Sheets

U.S. PATENT DOCUMENTS

| | | | |
|---|---|---|---|
| 2004/0179666 A1* | 9/2004 | Milton | 379/201.02 |
| 2004/0225747 A1* | 11/2004 | Kadi | 709/232 |
| 2005/0003804 A1 | 1/2005 | Huomo et al. | |
| 2005/0113077 A1 | 5/2005 | Bushnell et al. | |
| 2005/0147226 A1 | 7/2005 | Anupam et al. | |
| 2005/0207397 A1 | 9/2005 | Berndt et al. | |
| 2006/0043164 A1 | 3/2006 | Dowling et al. | |
| 2006/0072726 A1 | 4/2006 | Klein et al. | |
| 2006/0268765 A1* | 11/2006 | Bajic et al. | 370/328 |
| 2007/0217593 A1 | 9/2007 | Pfleging et al. | |
| 2007/0269024 A1* | 11/2007 | Dalrymple et al. | 379/37 |
| 2008/0002820 A1 | 1/2008 | Shtiegman et al. | |
| 2008/0039080 A1 | 2/2008 | Bertagnole et al. | |

FOREIGN PATENT DOCUMENTS

| | | |
|---|---|---|
| EP | 1487186 | 12/2004 |
| JP | H06-77997 | 3/1994 |
| JP | H09-247742 | 9/1997 |
| JP | 2001-197206 | 7/2001 |
| JP | 2003-102046 | 4/2003 |
| JP | 2004-512750 | 4/2004 |
| JP | 2004-254323 | 9/2004 |
| JP | 2005-323317 | 11/2005 |
| JP | 2006-140922 | 6/2006 |
| WO | WO 00/59188 | 10/2000 |
| WO | WO 01/76206 A1 | 10/2001 |
| WO | WO 02/33984 | 4/2002 |
| WO | WO 02/078368 | 10/2002 |
| WO | WO 2005/107122 A3 | 11/2005 |

OTHER PUBLICATIONS

European Search Report for Application No. 07121920, dated Jun. 25, 2008.

Background of the invention for the above captioned application (previously provided).

U.S. Appl. No. 11/502,200, Bertagnole.

Mitel Networks 5810 PDA Application Installation Instructions; 2001; 13 pages; Mitel Networks Corporation; Canada.

Mitel 5240 IP Phone Web-enabled IP Phone Data Sheet; 2005; 2 pages; Mitel Networks Corporation.

Mitel 5230 IP Phone; Available at http://www.mitel.com/DocController?documentId=9563; undated; Mitel Networks Corporation.

Avaya Communication Manager, Enabling Intelligent, Highly Available and Open Communications Across Your Enterprise; 2006; 8 pages; Avaya Inc.

Configuring Avaya Communication Manager for H.323 Signaling and IP Trunks with Nortel Succession 1000—Issue 1.0; Solution & Interoperability Test Lab Application Notes; 2005; 53 pages; Avaya Inc.

Avaya IP Telephony Implementation Guide Communication Manager 3.0; Jul. 2005; 77 pages; Avaya Inc.

Creating Caller Applications With Modular Messaging 1.1—Issue 1.0; Solution & Interoperability Test Lab Application Notes; 2004; 21 pages; Avaya Inc.

Cisco CallManager Extension Mobility; Cisco CallManager Features and Services Guide; undated; 36 pages.

Avaya EC500 Product Summary; Available at: http://www.avayaglobalconnect.com/ipTelephony/eclips_ec500_summary.asp; undated; 2 pages.

Tom Starner; "Office Hotelling Makes Room for Improvement"; IQ Magazine; Available at: http://www.cisco.com/web/about/ac123/iqmagazine/archives/mar_apr_2003/departments/net_strategies/workforce.html; Mar./Apr. 2003; 3 pages; Cisco Systems, Inc.

Fred Sandsmark; "Enhanced Communications with IP Telephony"; IQ Magazine; Available at: http://www.cisco.com/web/about/ac123/iqmagazine/archives/may_june_2003/features/enhanced_communications.html; May/Jun. 2003; 5 pages; Cisco Systems Inc.

IQ Magazine Mar./Apr. 2003; Available at http://www.cisco.com/web/about/ac123/iqmagazine/archives/mar_apr_2003; Mar./Apr. 2003; 3 pages; Cisco Systems Inc.

Avaya Demonstrates New IP Telephony Applications at CommunicAsia 2001; Available at: http://www.avaya.com/gcm/master-usa/en-us/corporate/pressroom/pressreleases/2001/pr-010619a.htm; 6/19/20; 3 pages; Avaya Inc.

Red Deer Public Library is Open for Discovery with the Avaya IP Office Solution; 2002; 4 pages; Avaya Inc.

Desk/Flex—Corporate Hoteling/Flexible Desk Sharing for Your Meridian 1 and CS 1000; 2005; 2 pages; Professional Resource Management, Inc.

U.S. Appl. No. 12/277,023, filed Nov. 24, 2008, Bertagnole, et al.

UK Intellectual Property Office Search Report on corresponding patent application GB 0715046.9.

Official Action for U.S. Appl. No. 11/502,200, mailed Oct. 28, 2008.

European Search Report and Written Opinion for Application No. 07121920, dated Jul. 2, 2008.

Official Action for European Application No. 07121920, dated Nov. 21, 2008.

The Notice of Preliminary Rejection (including English Translation) for Korean Patent Application No. 2008-0009506, dated Sep. 29, 2009.

English Translation of Official Action for Japan Patent Application No. 2008-20304, mailed Feb. 21, 2011 3 pages.

* cited by examiner

TRAFFIC LOAD BALANCING

CROSS REFERENCE TO RELATED APPLICATION

The present application claims the benefits of U.S. Provisional Application Ser. No. 60/887,408, filed Jan. 31, 2007, of the same title and to the same inventors, which is incorporated herein by this reference.

Cross reference is made to U.S. patent application Ser. No. 11/502,200, filed Aug. 9, 2006, entitled "Enterprise Mobility User", which is incorporated herein by this reference.

FIELD OF THE INVENTION

The invention relates generally to telecommunications systems and particularly to wired mobility in telecommunications systems.

BACKGROUND OF THE INVENTION

Enterprise user mobility, or the ability of subscribers to use stations located across the enterprise network while still being able to receive consistent phone service, is highly desirable in the global marketplace. Many large companies are commonly decentralized with large campuses and branch offices located around the world. Preferably, enterprise user mobility provides subscribers with the continued access to features and other functionality located on the subscriber's home, or assigned, station.

Enterprise user mobility is currently being offered in Voice over Internet Protocol or VoIP products of various vendors, such as Extension Mobility™ by Cisco. The Cisco product has an extensive Application Program Interface or API that allows access to third party applications to setup the home and visited, or remote, VoIP stations for remote access without the subscriber needing to touch either handset. To effect the reconfiguration of the remote station, the system administrator uses the API to enter a User Identifier or UI and Personal Identification Number or PIN. When the subscriber logs into the visited station and is successfully verified, the visited station automatically reconfigures with the subscriber's home station profile information. Where more than one switch is involved at the locations of the home and visited station, call processing is performed at the home switch and not the visited switch because the visited switch simply acts as a router.

These products, however, are limited to VoIP stations and are not adaptable to circuit-switched or Time Division Multiplexed or TDM telephones. IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications. However when insufficient network resources are available for voice communications or one or more IP network components are down, voice communications can be adversely impacted. While great strides have been made to provide improved levels of voice quality in VoIP communications, rapid and unexpected deteriorations in the QoS or GOS still occur with some frequency and are unacceptable for many businesses.

For this reason, many businesses prefer wired circuit-switched or TDM communication devices. Although intra-switch wired mobility, such as hoteling or hot-desking, is known, inter-switch enterprise user wired mobility is not available for circuit-switched or TDM communication devices, particularly wired mobility in which the subscriber has close to the full functionality that the subscriber would have if he or she were at his or her home station. As will be appreciated, hoteling or hot-desking is a function that allows subscribers, without a native station, to be assigned anywhere in the local area network controlled by a common enterprise switch. Additionally, even with IP enabled mobility the native subscriber normally associated with the remote IP phone taken over by the traveling subscriber is no longer associated with that IP phone. This can create problems with the native subscriber having remote access to the features of the IP phone, such as abbreviated dial, bridged appearance, dial intercom, and the like.

User mobility could provide additional benefits by permitting users to load balance circuit-switched communication devices among networked servers. User mobility could, for example, allow users normally homed at a site controlled by one server to register at a remote site due to the inaccessibility of the home location for any reason, thereby providing for business continuity by the "stranded" user.

SUMMARY OF THE INVENTION

These and other needs are addressed by the various embodiments and configurations of the present invention. The present invention is directed to subscriber mobility in a centralized or decentralized enterprise network.

In a first embodiment, a method includes the steps of:

(a) providing, at a second switch/server, a virtual communication device and a second electronic address;

(b) thereafter creating, at the second switch/server, a visitor application record associated with a first subscriber's communication device controlled by a first switch/server; and (c) in response to step (b), associating the virtual communication device with the first communication device, the second electronic address being different from a first electronic address associated with the first communication device.

Each virtual station on the second switch/server has a corresponding mobility user station record. For example, a first mobility user station record corresponds to the second electronic address. The first and second electronic addresses are typically a private or public number, such as a Direct Inward Dialing or DID extension.

While the first subscriber is associated with the virtual communication device, the first subscriber continues to use the first communication device but outgoing call processing is off loaded to the second switch/server. In one configuration, this is done by maintaining at the first switch/server not only a home station record but also a home application record for the first communication device. The home station record configures the first communication device for the first subscriber and the home application record includes the electronic address of the respective virtual communication device and points to the corresponding mobility user station record. While the first subscriber is associated with the virtual communication device, a home application record is maintained to redirect incoming calls for the first communication device to the second communication device.

The first embodiment may be used to provide intra- and inter-switch and packet-switched and circuit-switched subscriber mobility.

The present invention can have a number of advantages. It can allow load balancing for outgoing call processing among networked switches/servers and therefore provide subscribers with a higher availability of outgoing call processing. Load balancing allows users normally homed at a site controlled by a first switch/server to register at a remote site controlled by a second switch/server. Load balancing can be effected for users not only of packet-switched stations but also users of circuit-switched or TDM stations. This can provide service in a simple and robust way with straightforward administration but not requiring new network components/servers. This ease of incorporation into existing enterprise network architectures is made possible by the software enablement of the mobility feature. From the user's perspective, this invention can reduce cost because of reuse of existing digital stations rather than having to acquire new IP-based stations. Digital stations normally have a higher degree of availability and higher Quality of Service (QoS) than IP-based stations. Finally, the invention can provide for simpler, automated administration through the use of mobility user station records.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The exemplary systems and methods of this invention will be described in relation to telecommunications switches. However, to avoid unnecessarily obscuring the present invention, the following description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

According to a first embodiment of the present invention, first and second enterprise switch/servers 100 and 104 are interconnected by first and second private and/or public networks 108 and 110. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. Each of the first and second switch/server 100 and 104 services corresponding first and second enterprise premises 112 and 116, respectively.

In one configuration, the first network 108 is a circuit-switched network, such as the Public Switch Telephone Network or PSTN, while the second network 110 is a packet-switched network, such as the Internet. Each of the first and second switches is connected via a plurality of trunks 120 and 124, respectively, (which may be for example Primary Rate Interface, Basic Rate Interface, Internet Protocol, and H.323 trunks) to the first network 108 and via link(s) 128 and 132, respectively, to the first, second, . . . Nth stations 136*a-n* and first, second, . . . Mth stations 140*a-m*, respectively.

A gateway (not shown), such as Avaya Inc.'s, G700™, G650™, G600™, MCC/SCC™ media gateways, may be positioned logically between each of the first and second switches/servers and the second network 110 to process communications passing between the appropriate switch/server and the second network.

In one configuration, the stations, or communication devices, 136a-n and 140a-m are circuit-switched and/or TDM devices. As will be appreciated, such stations 136 and 140 are normally plugged into a Tip ring (Digital) interface that causes electronic signals from the station to be placed onto a TDM bus (not shown). Alternatively, the station is a digital set connected to a corresponding port. Each of the stations corresponds to one of a set of internal (Direct-Inward-Dial) extensions on its controlling switch/server. The controlling switch/server can direct incoming contacts to and receive outgoing contacts from these extensions in a conventional manner. In this configuration, the stations 136 and 140 include, for example, wired and wireless telephones, PDAs, H.320 video phones and conferencing units, voice messaging and response units, and traditional computer telephony adjuncts. Examples of suitable devices are the 2410™, and 2420™ Digital Telephones of Avaya, Inc.

In another configuration, the stations, or communication devices 136a-n and 140 a-m are packet-switched stations or communication devices, such as IP hardphones (e.g., Avaya Inc.'s 4600 Series IP Phones™), IP softphones (e.g., Avaya Inc.'s IP Softphone™), Personal Digital Assistants or PDAs, Personal Computers or PCs, laptops, packet-based H.320 video phones and conferencing units, packet-based voice messaging and response units, and packet-based traditional computer telephony adjuncts. Examples of suitable devices are the 4610™, 4621 SW™, and 9620™ IP telephones of Avaya, Inc.

In other configurations, the stations 136 a-n and 140 a-m are a mixture of circuit- and packet-switched communication devices.

It should be noted that the invention does not require any particular type of information transport medium or protocol between switch/server and stations and/or between the first and second switches/servers, i.e., the invention may be implemented with any desired type of transport medium as well as combinations of different types of transport media. For example, the inter-switch protocols may be QSIG, SIP, H.323, and the like. Inter-switch/server control signaling can be transmitted over the first and/or second network. In one configuration, the first network includes QSIG control signaling and bearer channels.

Each of the first and second switches/servers 100 and 104 are preferably software-controlled and include a controlling application, such as a modified form of Communication Manager™ by Avaya, Inc. As can be seen from FIG. 1, the memory of each of the first and second switches/servers include a mobility agent module 150 to provide mobility for subscriber stations, and the memory of the first switch/server 100 includes a load balancing module 180 to provide an automated load balancing trigger. The mobility agent modules 150 provide the capability of subscribers to register as a remote or visiting user at a virtual visited station controlled by a different switch/server than the premises of the subscriber's physical home station. Upon registration, the mobility agent module 150 of the home switch/server forwards an image of the subscriber's home station to mobility agent module 150 of the visited, or remote, switch/server. The mobility agent module 150 in the visited switch/server downloads the image to the virtual visited station.

Figure 1:
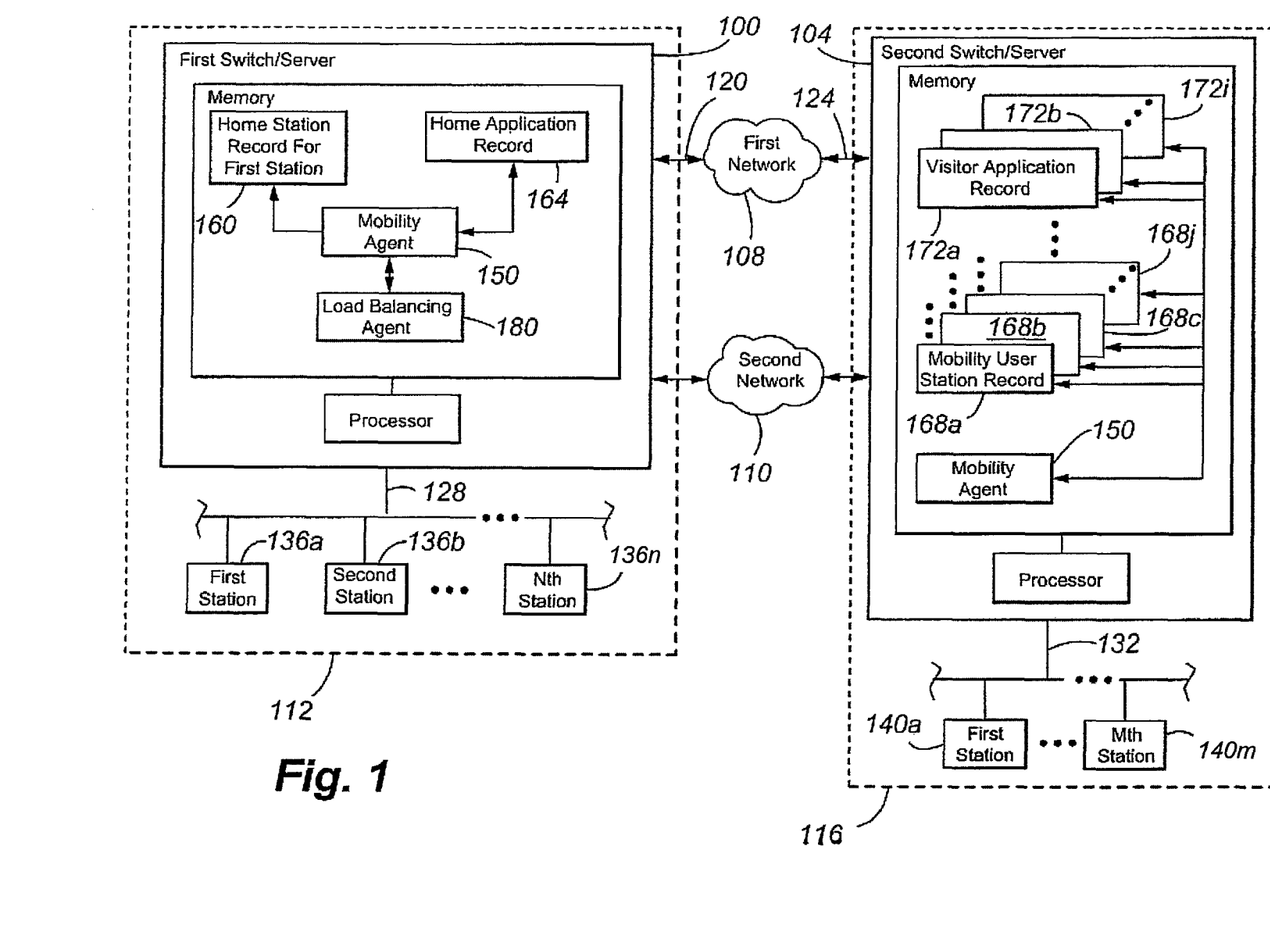
FIG. 1 is a block diagram of an architecture according to an embodiment of the present invention.

The mobility agent module 150 allows call origination processing to be done natively by the visited switch, which, in the example of FIG. 1, is the second switch/server 104. A first subscriber normally homed at a site controlled by the first switch/server 100 is registered as a "visiting" subscriber at the second switch/server 104. Through registration, the "visiting" subscriber assumes an Administration Without Hardware ("AWOH") identity (or "X" station) from the second switch/server 104. As will be appreciated, the AWOH identity represents a virtual station that is not associated with a specific port.

The visiting subscriber's normal home (enterprise) identity (e.g., home telephone number) is sent as the calling party information regardless of whether the call is processed at the home or visited switch/server. Where the outgoing call is processed at the visited switch/server and the first network 108 will not accept the subscriber's normal calling party information (e.g., name and home station phone number), the subscriber's calling information for the visited AWOH station (e.g., name and visited station phone number) is sent as an option. Emergency (e.g., 911) calls are processed by sending only home switch/server calling party information to ensure that emergency response personnel can respond correctly and effectively as well as call back if the need arises. For example, if the subscriber were to make an emergency call from a visited station 136a-n, the second switch/server 104 would provide to the Public Safety Access Point or PSAP the telephone number and/or location information (e.g., Emergency Location Information Number or ELIN) of the calling station 136a-n not the subscriber's AWOH station.

Incoming calls to the visiting subscriber are routed to the home station 136a-n of the subscriber on the home (first) switch/server, and most, if not all, of the functionality accessible to the subscriber via his or her home station 136a-n is maintained in the subscriber's home (first) switch/server 100.

In one configuration, the load balancing module 180 detects the occurrence of a predetermined event or trigger that warrants call origination processing offloading from the first switch/server 100 to the second switch/server 104. Examples of such events include the occupancy of a selected function or set of functions. By way of illustration, the module 180 sums the number of processing cycles in the first switch/server consumed by the processes constituting the bulk of switching logic and determines the occupancy for the switching logic. When the occupancy exceeds a selected threshold, the module 180 offloads call origination for a set of stations to the second switch/server 104. Multiple thresholds can be used. Each threshold progressively causes more call origination processing to be offloaded to another switch/server.

In the following paragraphs, the functionality of the architecture will be discussed with reference to various examples. In a first example, a first subscriber having, as his or her home station, the first station 136a controlled by the first switch/server 100 is registered, as a visiting subscriber, by the second switch/server 104.

With this example in mind, the memories of the first and second switches/servers include a number of data structures to effect the foregoing functionality. The data structures include the home station record 160 for the first station 136a, the home application record 164 for the first station 136a, the mobility user station record 168 for the virtual visited station, and the visitor application record 172 for the virtual visited station. The home station record 160 is the administered record for the first station and includes a variety of information, such as first subscriber's name (or UI), first subscriber public name, first station private number (e.g., a five-digit internal extension), first station public number (e.g., a 10-digit DID), first subscriber home security information (e.g., a security code such as PIN), first station type, first station button/key record (which provides, for each button/key the corresponding label or type and state), COS for the first station, whether the first station is mobility enabled, call state information (e.g., what call appearance is active, what call appearance is ringing, and the like), and a pointer to the home application record (if not concatenated to the home station record for the first station). The home application record 164 includes the extension of the virtual visited station, a pointer to the home station record for the first station (if not concatenated to the home station record for the first station), and a pointer to the system being visited. The mobility user station record 168 for the visited station includes a public number (e.g., a 10-digit DID) and may contain some of the same generic (user independent) type of information as the home station record for the first station. The information can include, for example, a private number (e.g., a five-digit internal extension), first station type, first station button/key record (which provides, for each button/key the corresponding label or type and state), COS for the first station, and call state information (e.g., what call appearance is active, what call appearance is ringing, and the like. Finally, the visitor application record 172 includes all information needed for the first subscriber to make a call from the virtual visited station. It therefore includes the first subscriber public name, first station private number (e.g., a five-digit internal extension), first station public number (e.g., a 10-digit DID), virtual visited station private number, first subscriber home security information (e.g., a security code such as PIN), station types of the home and visited stations, call state information (e.g., what call appearance is active, what call appearance is ringing, and the like), and visited station button/key record. Preferably, the records 160, 164, 168, or 172 are object-oriented, though they may be relational data structures.

The visitor application record 172 and mobility user station record 168 for the visited station are independent of one another; that is, they are separate records, or located at physically distinct locations in memory, and can both survive system resets. The visitor application record 172 does, however, point to a corresponding mobility user station record that is in use by the respective visiting subscriber.

As can be seen from FIG. 1, the memory of the second switch/server 104 includes a plurality, or pool, of different mobility user station records 168*a-j*, each of which can be associated with a different visitor application record 172*a-i*. Each mobility user station record 168*a-j* has a different private and/or public number, and each visitor application record 172*a-i* is associated with a different one of the first, second, . . . nth stations 136*a-n*. When a visiting subscriber is registered with the second switch/server 104, one of the mobility user station records from the pool is selected and associated with the subscriber's respective visitor application record. When the visiting subscriber is unregistered with the second switch/server 104, the mobility user station record is returned to the pool for association with a different subscriber. This is done by deleting the previously associated visitor application record in its entirety or only the pointer, in the application record, to the mobility user station record while retaining the application record for later reuse in the event that the same subscriber again registers with the second switch/server 104.

The operation of the mobility agent modules 150 will now be described with reference to FIGS. 1-3. In each example, a stimulus has transpired causing call origination for one or more of the stations 136*a-n* to migrate from the first switch/server 100 to the second switch/server 104. Examples of stimuli include processing load on the first switch/server 100 in excess of a selected threshold (or available CPU's are less than a selected threshold) and catastrophic failure of the first switch/server or a component thereof, or another component such as a gateway, or a link.

A first example will be described with reference to FIGS. 2-4. In this example, the stimulus is excessive processing load on the first switch/server 100 and the migrated stations 136*a-n* are packet-switched.

Figure 2:
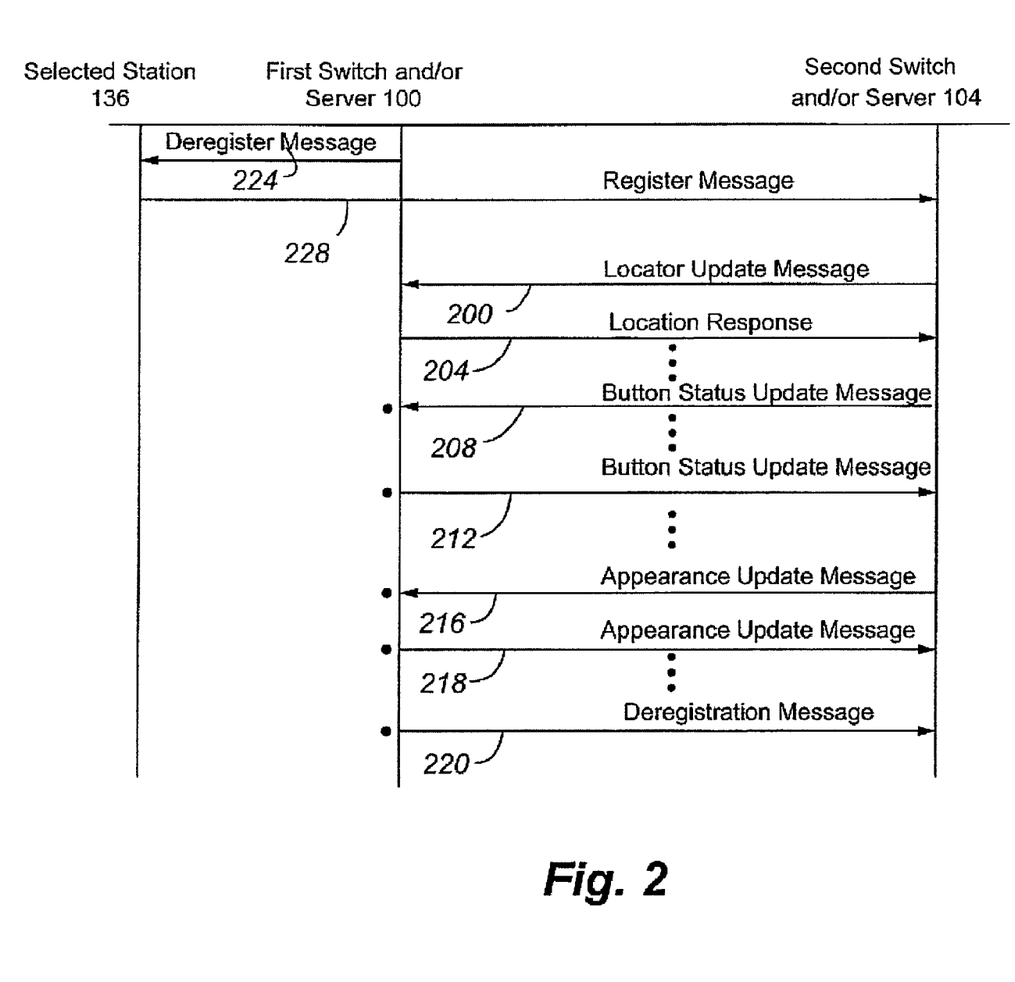
FIG. 2 is an inter-switch signal flow diagram according to an embodiment of the present invention.
Figure 4:
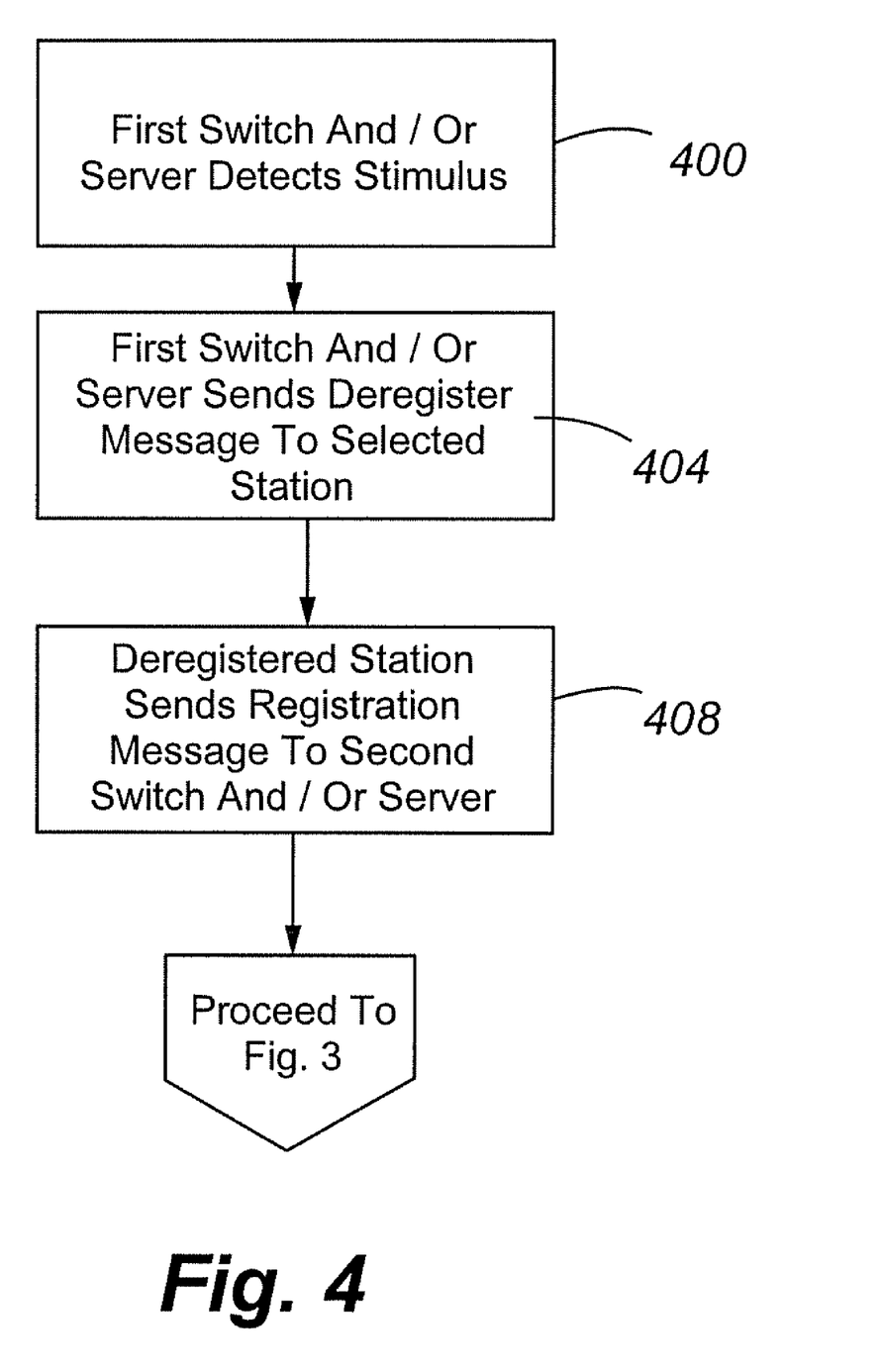
FIG. 4 is a flow chart according to an embodiment of the present invention.

Turning now to FIGS. 2 and 4, the load balancing module 180 determines in block 400 that a predetermined stimulus has occurred. In response, the module 180 notifies the mobility agent module 150.

In block 404, the module 150 selects a set of stations 136*a-n* to be migrated to the second switch/server 104. The set may include one or more of the stations. The module 150 forwards, immediately upon receipt of the notification or when one of the members of the set attempts call origination, to each station in the set a deregister message 224, which terminates the registration of the notified station with the first switch/server. The deregister message may include an electronic address of the second switch/server 104. Where multiple switches/servers are part of a common enterprise network, the various switches/servers can periodically exchange processing load information so that selection of a switch/server for offloading call origination can be made intelligently. Alternatively, addresses of other switches/servers may be stored in each of the switches/servers or stations serviced thereby in an order of preference.

In block 408, the deregistered station sends a registration message 228 over the second (packet-switched) network 110 to the second switch/server 104. In one configuration, the registration message includes the extension of the deregistered station, the authentication information (e.g., password) for the deregistered station, and the extension of a selected mobility user station record 168*a-j*. The extension was provided previously by the first switch/server 100 in the deregistration message 224. The second switch/server then creates a visitor application record 172*a-i* associating the deregistered station's extension with the selected mobility user station record 168*a-j*. This configuration assumes knowledge by the first switch/server 100 of the extensions used by mobility user station records 168*a-j* and which are currently available. In another configuration, this knowledge is not required. The deregistered station sends a registration message 228 to the second switch/server 104 that contains the extension of the deregistered station and the subscriber's authentication information. The second switch/server 104 realizes that the extension of the deregistered station is not native to that switch/server and may realize that the extension is native to the first switch/server 100. Notwithstanding this knowledge, the second switch/server 104 does not deny registration but rather selects an available mobility user station record 168*a-j* and creates a visitor application record 172*a-i* associating the selected record 168*a-j* with the extension of the deregistered station. This configuration is more desirable than the prior configuration as it obviates the need for the switches/servers in the enterprise network to exchange information regarding available mobility user station records. In either configuration, the uniqueness of each extension across the enterprise network will prevent inter-switch/server conflicts with extensions.

Figure 3:
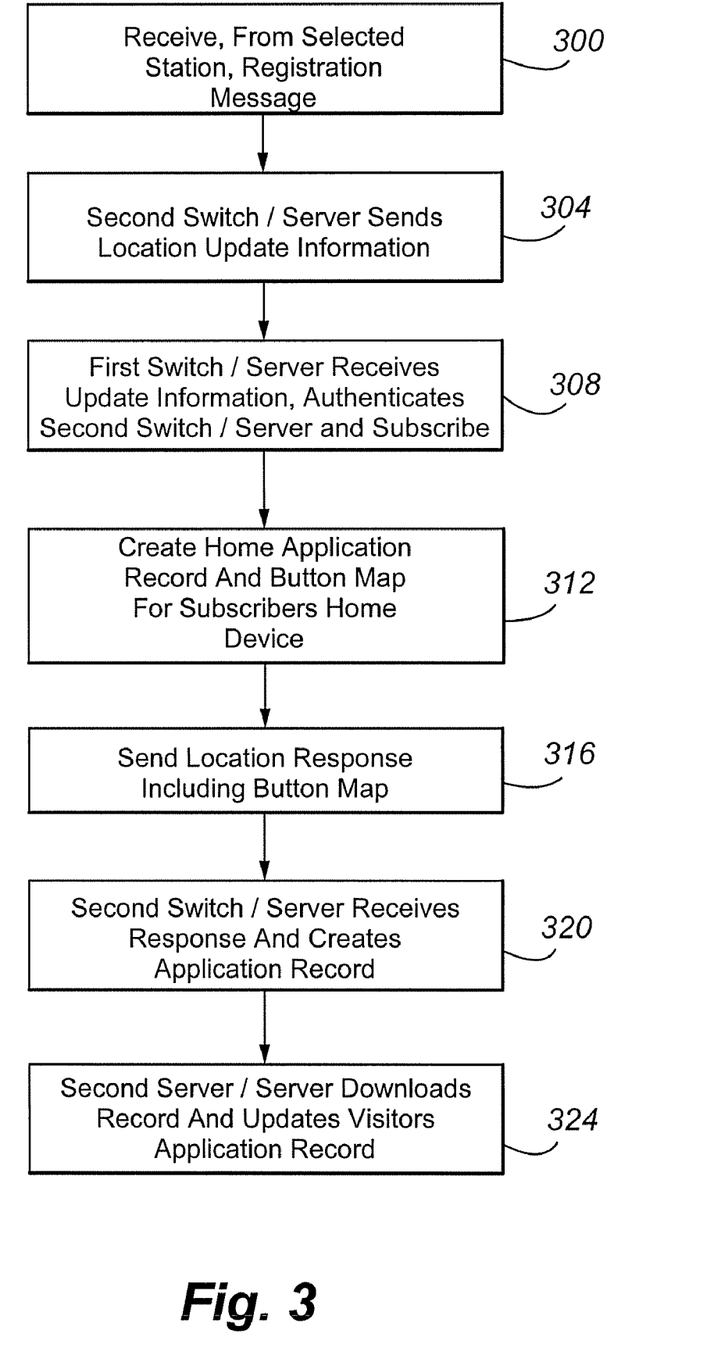
FIG. 3 is a flow chart according to an embodiment of the present invention.

Control then passes to FIG. 3. Block 300 assumes that the registration message 228 has been received by second switch/server 104 from a selected station 136*a-n* of the first switch/server 100.

In block 304, the mobility agent module 150 of the second switch/server 104 sends a location update message 200 to the mobility agent module 150 in the first switch/server 100. The location update message 200 includes the extension of the selected mobility user station record, the extension of the first station 136a, the entered first subscriber's home security information, and, if appropriate, the station record's 140 station type. The location update message 200 is effectively a registration request by the first subscriber to register for wired mobility from the first station 136a to the mobility user station record 168a-j.

In block 308, the mobility agent module 150 of the first switch/server 100 receives the location update message 200 and compares the home security information in the home station record 160 against the entered home security information. If the information fails to match or if the home station record 160 indicates that the first station 136a is not eligible for wired mobility (e.g., using the COS permissions), the module 150 denies the request and returns a denial message to the mobility module in the second switch/server. If the information matches and if the home station record 160 indicates that the first station 136a is eligible for wired mobility, the module 150 proceeds to step 312. If the home station record 160 indicated that the user is already associated with a different mobility user station record 168, a deregistration indication will be passed to the visited system for the previously visited record 168.

In block 312, the mobility agent module 150 in the first switch/server 100 creates a home application record 164 and a button map of the first station 136a. The button map can be any set of data strictures defining the layout of the keys and buttons of the first station 136a. As will be appreciated, there are two types of buttons/keys, namely status buttons (e.g., a button that indicates the state of and, when pressed, invokes a feature such as send all calls) and call origination buttons (e.g., speed or abbreviated dial). The button map typically indexes button/key identifiers against corresponding status and origination button/key types or labels (or first subscriber selected or programmed functions or features) and states. At least each programmable button/key on the first station 136a, and in some applications nonprogrammable buttons/keys, has a corresponding button identifier. In other words, the map has, for each button/key identifier, a corresponding button/key type or label and button/key state. For example, the button map includes abbreviated dial buttons, intercom buttons, and bridged appearances of other extensions on the first station 136a. "Button" and "key" are used herein as alternate expressions for signal activators.

In block 316, the mobility agent module 150 in the first switch/server 100 sends a location response 204 to the mobility agent module 150 in the second switch/server 104. When the first station and virtual station corresponding to the mobility user station record are of the same type, the response 204 includes the first station type, button map, message waiting state indicator, first subscriber's public number, first subscriber's private number, and the first subscriber's public name. When the stations are of different types, the response 204 may optionally include the virtual station's private number, the virtual station's public number, and the definition for the call appearances of the first station 136a for mapping to the visited virtual station. As will be appreciated, virtual stations, such as AWOH and X stations, frequently are not associated with a specific type of physical station and can universally apply to all physical station types.

In block 320, the mobility agent module 150 in the second switch/server 104 receives the awaited response 204 and creates the visitor application record 172. The second station button/key record is produced by the mobility agent module 150 in the second switch/server 104 by mapping the button map of the first station 136a against the button/key layout of the virtual station. When the stations are of the same type, the home station record 160 and visitor application record 172 are substantially the same, though the layouts of the records differ. When the first subscriber activates buttons/keys on the virtual station, the application record 172, and not the home station record 160, is used to determine the corresponding function.

In step 324, the mobility agent module 150 in the second switch/server 104 reconfigures the virtual station as defined in the visitor application record 172. When the stations are of different types only a default set of features are provided on the virtual station or, alternatively, matching keys/buttons are given common functionality. When the stations are of the same type, the stations appear to be the same to the first subscriber. The first station 136a, during the duration of mobility registration, displays that mobility registration is in effect and provides the private number of the virtual station.

The above method effects load balancing to another less loaded switch/server even though the subscriber remains on this home switch/server and continues to use his or her home station. The load balancing operation is seamless to the subscriber.

Deregistration from the mobility user station record is effected automatically by the first switch/server in response to a cessation of the stimulus or by the first subscriber entering a deactivate feature access code, the private extension of the first station 136a, and the security information. A deregistration message 220 containing this information is then sent from the first switch/server 104 to the mobility module 150 at the second switch/server. After successful authentication, the registration is cleared at the second switch/server 100 and a deregistration message is forwarded by the second switch/server to the first station 136a-n. In that event, the home and visitor application records 164 and 172 are cleared from the memories of the first and second switches/servers, respectively. Deregistration can also be effected automatically by the expiration of an automatic deregistration timer or placement of an emergency call from the first station. Deregistration may also be initiated at the second switch/server 104 in response to constraints in its own processing capacity or available processing capacity updates received from the first switch/server or automatically in the response of a successful registration of the user on a station other than the first station.

Preferably, the messages 200, 204, 208, 212, 216, and 220 are sent out-of-band (e.g., over the D-channel in the QSIG protocol) relative to the voice channel to conserve bandwidth.

Incoming calls to the first subscriber while mobility registered at the second station are normally controlled by the first switch/server 100 and not the second switch/server 104. Home switch/server control of the call is preferably used so that call processing for call coverage or diversion into voice messaging is managed at the first switch/server 100. When there is an incoming call to the first station 136a while the first subscriber is mobility registered at the second switch/server 104, the mobility agent module 150 in the first switch/server 100 determines from the application record 164 that mobility registration is in effect and that the first subscriber is registered at the second switch/server. The call setup message is forwarded to the mobility agent module 150 in the second switch/server 104 to set up the call.

Outgoing calls made using the dial pad on the first station are processed by the second switch/server 104. For example, calls using an abbreviated dial or intercom feature button on the first station to place the call are processed by the second switch/server using the number stored in the abbreviated dial list on the first switch/server and forwarded to the second switch/server.

Station updates are exchanged by the first and second switches/servers during mobility registration. When, during mobility registration, the "visiting" first subscriber makes an outgoing call from the first station, the mobility agent module 150 in the second switch/server 104 sends an appearance update message 218 to the mobility agent module 150 in the first switch/server providing the call appearance selected for the first station 140*b* for the call. When, during mobility registration, the first switch/server receives an incoming call to the first subscriber, the mobility agent module 150 in the first switch/server 100 generates and sends an appearance update message 216. The message 216 contains the first subscriber's private number for the first station 136*a*, the extension of the associated mobility user station record, an identifier of the incoming call, and the call appearance selected for the incoming call. This can be important because the first and second switches/servers can be configured to select call appearances differently. By including the call appearance in the message 216, the call appearance configured for the first switch/server 100 is used for the first station 136*a-n*, which is now registered with the second switch/server 104, to identify the incoming call.

While the first station is registered with the second switch/server, button status update messages 208 and 212 are used for the continuous update of buttons that are tracked (e.g., call appearances and bridged appearances). When an update message is received by a mobility agent module 150, the module updates the host (e.g., first or second) switch/server's button/key record for the controlled station (e.g., the first or second station). Available update messages 208 and 212 include idle, alerting with and without ringing and in-use states. The stimulus for such messages is the activation of button/key of the first station. Thus, when a feature button is pressed at the first station, the mobility agent module 150 in the second switch/server sends an update message 212 to the first switch/server so the desired feature is activated or deactivated.

Status buttons/keys are thus processed by the first switch/server 100 while the first station is registered with the second switch/server 104. When a status button/key is pressed in the first station, a button status update message 212 is sent by the mobility agent module 150 in the second switch/server 104 to the mobility agent module 150 in the first switch/server 100. The feature is then activated in the first switch/server 100. This home switch feature processing is done to save a phone call. For example, when the pressed status button/key is "send all calls" the first switch/server 100 and not the second switch/server 104 knows how to route the extension.

Although not depicted in FIG. 2, message waiting update messages are used to notify the second switch/server 104 of the first subscriber's message waiting lamp status and update that status whenever it changes.

Figure 5:
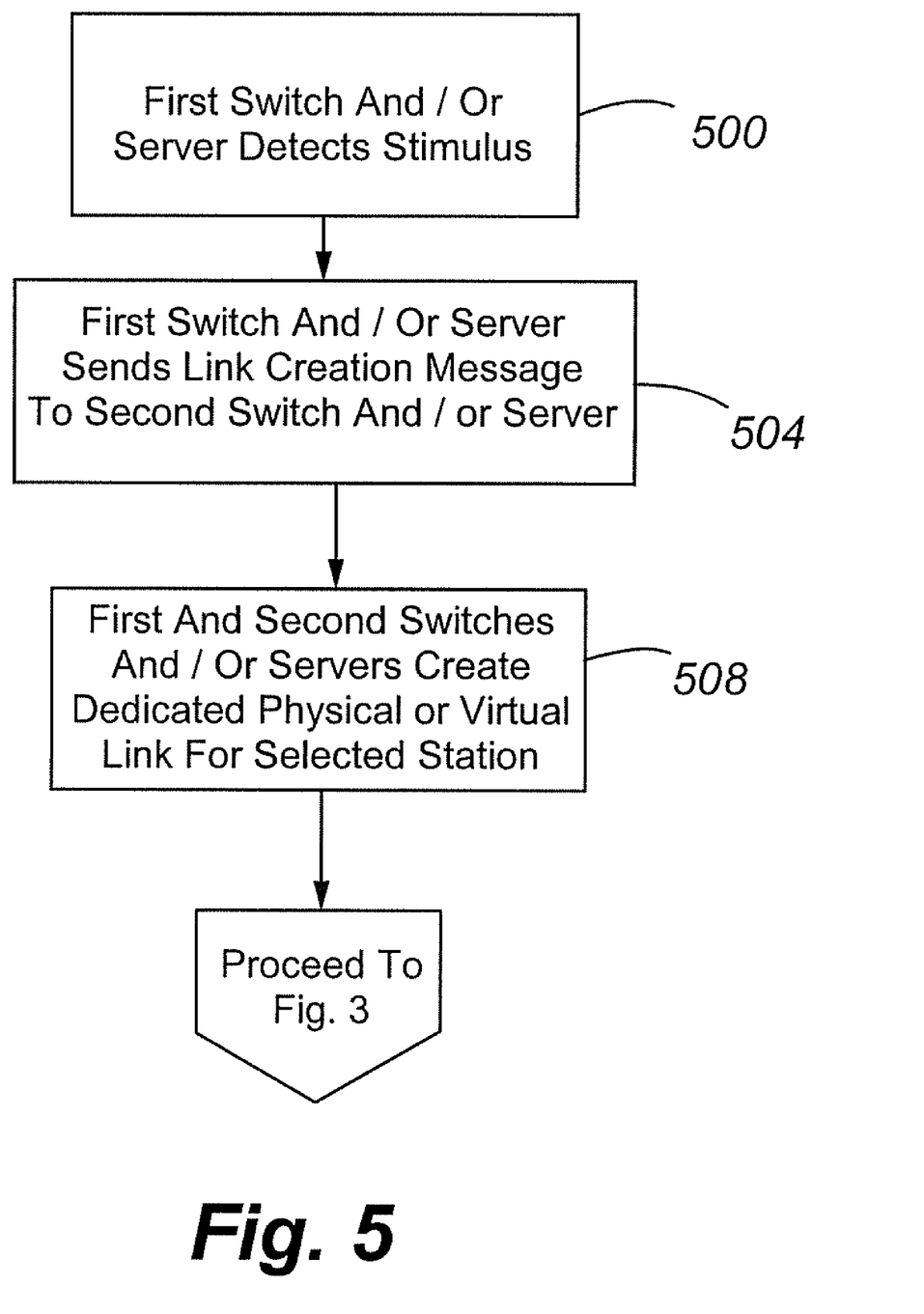
FIG. 5 is a flow chart according to an embodiment of the present invention.

Referring now to FIG. 5, the load balancing methodology using a circuit-switched (TDM) station 136*a-n* will now be described. In this example, the stimulus is the same as the prior example except that the set of stations 136*a-n* to be migrated to the second switch/server are TDM stations.

In box 500, the load balancing agent 180 in the first switch/server 100 detects the existence of a stimulus.

In box 504, a link creation message (not shown) is transmitted from the mobility agent in the first switch/server 100 to the mobility agent in the second switch/server 104, and, in box 508, the first and second switches/servers create dedicated physical or virtual link for a selected one of the first, second, . . . nth stations 136*a-n*. In one configuration, the message is an Non-Call Associated Temporary Signaling Connection or NCA-TSC message that creates a specific Data Link Connection Identifier or DLCI over an Integrated Services Digital Network ("ISDN") interface. Stated another way, the first and second switches/servers build a connection over a trunk 120, 124 between the physical interface with a selected one of the first, second, . . . nth stations 136*a-n* and a physical connector, such as a port, of the second switch/server 104. The connection may include a physical or virtual interface with the selected station 136*a-n* at the first switch/server 100. For example, the link may be done in hardware using a map that maps a channel from the station to a channel over the trunk. A virtual connection, in contrast, is done over an IP network by building a tandem connection. Effectively, the created link associates the selected physical station 136*a-n* at the first switch/server 100 with a virtual station on the second switch/server 104 corresponding to a selected one of the mobility user station records 168*a-j*, and the association deregisters the station with the first switch/server 100. As in the prior example, whenever the associated station 136*a-n* performs an activity, such as going on or off hook or a button press, that generates signaling, the signaling is transmitted by the first switch/server 100 over the physical or virtual interface directly to the second switch/server 104.

The remaining steps are set forth in blocks 304, 308, 312, 316, 320, and 324 of FIG. 3.

Another example of FIG. 5 will now be discussed. In this example, the stimulus is not related to load balancing but to administration. The stimulus is changing port connections for one or more TDM stations. As will be appreciated, it is known to change an association between a station and switch/server by plugging a station into a port of the selected switch/server and inputting a security code and administration data. This process, however, can be complicated and laborious. Using the methodology of FIG. 5, the selected station 136*a-n* to be moved to the second switch/server 104 is disconnected physically from the port of the first switch/server and connected physically to the port of the second switch/server 104. In a first variation, the blocks of FIG. 5 are employed; that is, the station is associated with a mobility user station record 168 on the second switch/server followed by the steps of FIG. 3. In a second variation, the station, using Terminal Translation Initialization or TTI, is notified to the second switch/server 104 by the private and/or public number of the station 136 on the first switch/server 100. The second switch/server 104 will recognize the number as being on the first switch/server 100, and will proceed with associating the station 136 with a selected one of the mobility user station records 168. Using this technique, stations may readily and easily be moved from switch-to-switch without the laborious manual operations traditionally required in switch administration. Group associations in the first switch/server 100 involving the moved station would not be disrupted using the present invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory.

Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving a load balance stimulus to migrate call origination from a first switch/server to a second switch/server, wherein the first switch/server controls two or more subscriber communication devices including a first subscriber's first communication device, and wherein the second switch/server controls two or more subscriber communication devices;
   providing, at the second switch/server, a virtual communication device and a second electronic address, wherein calls directed to or coming from the first communication device are routed through the virtual communication device controlled by the second switch/server;

the second switch/server receiving a registration message from the first communication device;

thereafter creating, at the second switch/server, a visitor application record associated with the first subscriber's first communication device, wherein the visitor application record comprises at least the following information: a first subscriber's name, the second electronic address, a first subscriber's home security information, a first communication device type, call state information, a button record having a set of a plurality of buttons identical to a set of a plurality of buttons on the first communication device, and a first electronic address;

in response to creating the visitor application record, associating the second electronic address of the virtual communication device with the visitor application record, the second electronic address being different from the first electronic address associated with the first communication device; and after and while the virtual communication device is associated with the visitor application record, receiving, from the first switch/server, an incoming call at the second electronic address associated with the second switch/server to set up the incoming call with the first subscriber's first communication device, wherein the incoming call is directed to the first communication device.

2. The method of claim 1, wherein, at the second switch/server, a mobility user station record corresponds to the virtual communication device and further comprising:

while the first subscriber is associated with the mobility user station record, the first switch/server maintaining a home communication device record for the first communication device, the home communication device record configuring the first communication device for the first subscriber; and while the first subscriber is associated with the mobility user station record, the first switch/server maintaining a home application record to redirect incoming calls for the first communication device to the second switch/server.

3. The method of claim 1, wherein, associating the virtual communication device with the visitor application record is performed when a selected stimulus is detected and is discontinued at a later time when the selected stimulus is no longer detected and wherein the selected stimulus is related to an inability of the first switch/server to initiate outgoing calls.

4. The method of claim 1, wherein the first communication device is packet-switched and further comprising before associating the virtual communication device with the visitor application record:

the first switch/server sending a deregister message to the first communication device, the deregister message terminating registration of the first communication device with the first switch/server; and in response to the first switch/server sending a deregister message, the second switch/server receiving, from the first communication device, a register message requesting registration of the first communication device with the second switch/server, wherein associating the virtual communication device with the visitor application record is performed when the first communication device is registered successfully with the second switch/server.

5. The method of claim 4, wherein the register message comprises the first electronic address and authentication information of the first subscriber.

6. The method of claim 1, further comprising:
disassociating the visitor application record from the first communication device; and
thereafter associating the visitor application record with a second communication device controlled by the first switch/server, the first and second communication devices being different.

7. The method of claim 1, wherein the first communication device is circuit-switched and further comprising before associating the virtual communication device with the visitor application record:

the first switch/server sending a link creation message to the second switch/server, the link creation message requesting creation of a dedicated link between the first communication device and the second switch/server; and creating the dedicated link.

8. The method of claim 1, wherein the first communication device is circuit-switched and wherein, associating the virtual communication device with the visitor application record is performed when a selected stimulus is detected and wherein the selected stimulus is related to the first communication device being disconnected physically from the first switch/server and connected physically to the second switch/server.

9. The method of claim 1, wherein at least one of the following features are available to the first subscriber while the first subscriber is associated with the visitor application record: bridging an incoming call to the first subscriber onto the first communication device, call coverage, speed-dialing, ringing patterns, customized button labels, abbreviated dial list, automatic call back, automatic message waiting, automatic intercom, busy indication for an extension or trunk, call appearance, call forwarding, call forward (busy/do not answer), dial intercom, extension to cellular, exclusion, personal Central Office-line, send all calls, internal extension group, priority calling, and attendant calling, wherein, for outgoing calls from the first communication device while the first communication device is associated with the mobility user station record, a number of the first communication device is sent as calling party information, and wherein, when an outgoing call to a universal emergency number is made from the first communication device, the first subscriber is disassociated automatically with the visitor application record.

10. The method of claim 1, wherein, while the first subscriber is associated with the visitor application record, incoming calls to the first subscriber are directed by the first switch/server to the second switch/server and by the second switch/server to the first communication device, and outgoing calls, originated by a call origination button, from the first subscriber initiated using the first communication device are directed by the first switch/server to the second switch/server setup with a called destination.

11. A non-transitory computer readable medium comprising processor executable instructions to perform the steps of claim 1.

12. An enterprise network, comprising:
a second mobility agent associated with a second switch/server, the second mobility agent operable to:
provide a mobility user station record associated with a virtual communication device, the virtual communication device being associated with a second electronic address, wherein calls directed to or coming from a first communication device are routed through the virtual communication device controlled by the second switch/server;

create a visitor application record associated with the first communication device, wherein a first subscriber is normally associated with the first communication device and a first electronic address is associated with the first communication device, and wherein the visitor application record includes information to make a call from the virtual communication device, wherein the visitor application record comprises at least the following information: a first subscriber's name, the second electronic address, a first subscriber's home security information, a first communication device type, call state information, a button record having a set of a plurality of buttons identical to a set of a plurality of buttons on the first communication device, and a first electronic address;
associate the mobility user station record with the first communication device, wherein the first and second electronic addresses are different;
a first mobility agent associated with a first switch/server, the first mobility agent operable to:
determine if mobility registration is in effect; and
if mobility registration is in effect, forward an incoming call directed to the first communication device to the second mobility agent to set up the incoming call.

13. The enterprise network of claim 12, wherein the first communication device is controlled by the first switch/server and wherein the first switch/server is further operable to:
while the first subscriber is associated with the mobility user station record, maintain a home communication device record for the first communication device, the home communication device record configuring the first communication device for the first subscriber; and
while the first subscriber is associated with the mobility user station record, maintain a home application record to redirect incoming calls for the first communication device to the second switch/server.

14. The enterprise network of claim 12, further comprising: a load balancing module operable to detect a limitation on the ability of the first switch/server to make an outgoing call, wherein, associating the mobility station user record with the first communication device is performed in response to detection of the limitation and wherein the limitation is related to at least one of an available processing resources and an unavailable processing resources of the first switch/server.

15. The enterprise network of claim 14, wherein the first communication device is packet-switched and further comprising before associating the mobility station user record with the first communication device:
the first switch/server sending a deregister message to the first communication device, the deregister message terminating registration of the first communication device with the first switch/server; and
in response to the first switch/server sending a deregister message, the second switch/server receiving, from the first communication device, a register message requesting registration of the first communication device with the second switch/server, wherein associating the mobility station user record with the first communication device is performed when the first communication device is registered successfully with the second switch/server.

16. The enterprise network of claim 15, wherein the register message comprises the first electronic address and authentication information of the first subscriber.

17. The enterprise network of claim 15, wherein the first communication device is controlled by the first switch/server and the mobility user station record is controlled by the second switch/server wherein, while the first subscriber is associated with the mobility user station record, incoming calls to the first subscriber are directed by the first switch/server to the second switch/server and by the second switch/server to the first communication device, and outgoing calls, originated by a call origination button, from the first subscriber initiated using the first communication device are directed by the first switch/server to the second switch/server setup with a called destination.

18. The enterprise network of claim 12, further comprising the operations:
disassociating the mobility user station record from the first communication device; and
thereafter associating the mobility user station record with a second communication device controlled by the first switch/server, the first and second communication devices being different.

19. The enterprise network of claim 12, wherein the first communication device is circuit-switched and further comprising before associating the mobility station user record with the first communication device:
the first switch/server sending a link creation message to the second switch/server, the link creation message requesting creation of a dedicated link between the first communication device and the second switch/server; and creating the dedicated link.

20. The enterprise network of claim 12, wherein the first communication device is circuit-switched and wherein associating the mobility station user record with the first communication device is performed when a selected stimulus is detected and wherein the selected stimulus is related to the first communication device being disconnected physically from the first switch/server and connected physically to the second switch/server.

21. The enterprise network of claim 12, wherein at least one of the following features are available to the first subscriber while the first subscriber is associated with the mobility user station record: bridging an incoming call to the first subscriber onto the first communication device, call coverage, speed-dialing, ringing patterns, customized button labels, abbreviated dial list, automatic call back, automatic message waiting, automatic intercom, busy indication for an extension or trunk, call appearance, call forwarding, call forward (busy/do not answer), dial intercom, extension to cellular, exclusion, personal Central Office-line, send all calls, internal extension group, priority calling, and attendant calling, wherein, for outgoing calls from the first communication device while the first communication device is associated with the mobility user station record, a number of the first communication device is sent as calling party information, and wherein, when an outgoing call to a universal emergency number is made from the first communication device, the first subscriber is disassociated automatically with the mobility user station record.

22. A non-transitory computer readable medium, comprising:
a plurality of visitor application records associated with a plurality of communication devices, the communication devices having a first set of electronic addresses associated with at least a first switch/server;
a plurality of mobility user station records associated with a plurality of virtual communication devices, the virtual communication devices being controlled by a second switch/server different from the at least a first switch/server and the virtual communication devices having a second set of electronic addresses associated with the second switch/server, wherein each of the plurality of visitor application records is associated with a specific one of the mobility user station records, wherein a first of the mobility user station records and virtual communication devices is associated with a first subscriber, wherein the first subscriber generates a call from a first communication device that is associated, by a visitor application record and a mobility user station record, with the first virtual communication device such that the first virtual communication device completes the call through the second switch/server rather than the first switch/server;

wherein, when the first communication device, associated with the first switch/server, receives a call origination for the first subscriber, the call origination being received through the first switch/server, the first switch/server transmits the call origination to the second switch/server, a first visitor application record associated with the first mobility user station record causes the second switch/server to access the mobility user station record associated with the first subscriber, the mobility user station record causes the second switch/server to send the call origination through the first virtual communication device associated with the first subscriber; and wherein the first communication device of the first subscriber is controlled by the first switch/server and has a first electronic address in the first set of electronic addresses, wherein the first mobility user station record has a second electronic address in the second set of electronic addresses, and wherein the first visitor application record on the second switch/server comprises at least the following information: a first subscriber's name, the first electronic address, a first subscriber's home security information, a first communication device type, call state information, a button record having a set of a plurality of buttons identical to a set of a plurality of buttons on the first communication device and the second electronic address.

23. The non-transitory computer readable medium of claim 22, wherein a home station record on the first switch/server comprises at least the following information: the first subscriber's name, first electronic address, first subscriber's home security information, first communication device type, first communication device button record configured for the first subscriber, class of service for the first communication device, and call state information and wherein a home application record on the first switch/server comprises at least the following information: the second electronic address and a pointer to the first mobility user station record.

\* \* \* \* \*

UNITED STATES PATENT AND TRADEMARK OFFICE
CERTIFICATE OF CORRECTION

PATENT NO. : 8,228,891 B2
APPLICATION NO. : 11/734135
DATED : July 24, 2012
INVENTOR(S) : Albert G. Bertagnole et al.

Page 1 of 1

It is certified that error appears in the above-identified patent and that said Letters Patent is hereby corrected as shown below:

At Column 19, line 19, after the word "the" insert --first-- therein.

At Column 19, line 20, after the phrase "subscriber, the" insert --first-- therein.

Signed and Sealed this
Eighth Day of January, 2013

David J. Kappos
*Director of the United States Patent and Trademark Office*